US008131287B2

(12) United States Patent
Jeong et al.

(10) Patent No.: US 8,131,287 B2
(45) Date of Patent: Mar. 6, 2012

(54) APPARATUS AND METHOD FOR DIAGNOSING FAULT AND MANAGING DATA IN SATELLITE GROUND SYSTEM

(75) Inventors: Seong-Kyun Jeong, Gwangju (KR); Sang-Uk Lee, Daejon (KR); Ok-Chul Jung, Daejon (KR); Jae-Hoon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 701 days.

(21) Appl. No.: 12/088,554

(22) PCT Filed: May 24, 2006

(86) PCT No.: PCT/KR2006/001942
§ 371 (c)(1),
(2), (4) Date: Aug. 21, 2008

(87) PCT Pub. No.: WO2007/037585
PCT Pub. Date: Apr. 5, 2007

(65) Prior Publication Data
US 2008/0313488 A1    Dec. 18, 2008

(30) Foreign Application Priority Data

Sep. 29, 2005    (KR) .................. 10-2005-0091530

(51) Int. Cl.
*H04W 4/00* (2009.01)
(52) U.S. Cl. .................. 455/427; 455/3.02; 455/12.1
(58) Field of Classification Search .............. 455/3.03, 455/12.1, 13.2, 98, 427, 404.1, 404.2, 456.1, 455/13.1; 701/213; 342/357.2, 357.395; 340/539.13
See application file for complete search history.

(56) References Cited

U.S. PATENT DOCUMENTS 4,578,665 A * 3/1986 Yang ........................ 246/166.1
4,752,967 A * 6/1988 Bustamante et al. ........ 455/13.4
(Continued)

FOREIGN PATENT DOCUMENTS
JP    H08-181644 A    7/1996
(Continued)

OTHER PUBLICATIONS

Louis P. Bolduc, X-33 Redundancy Management System, IEEE AESS Systems Magazine, pp. 23-28, May 2001.

*Primary Examiner* — Dominic E Rego
(74) *Attorney, Agent, or Firm* — Rabin & Berdo, P.C.

(57) ABSTRACT

Provided are an apparatus and a method for diagnosing fault and processing data of a satellite ground system. The apparatus and a method can prevent data loss of a satellite, and efficiently operate the satellite ground system using data buffer and penalty method when a temporary fault occurs. Data buffer stores data in fault situation and penalty method imposes high penalty in critical fault and low penalty in minor fault. System is managed according to penalty degree. The apparatus, includes: a satellite data processing and controlling means; a signal transforming means; a fault detecting and controlling means; a state displaying means for displaying a state of the satellite and the system; a penalty managing means for being notified whether the device has fault or not; a data storing means for storing and transmitting the data; and a system recovery supporting means.

18 Claims, 3 Drawing Sheets

U.S. PATENT DOCUMENTS

| | | | |
|---|---|---|---|
| 4,872,157 A | 10/1989 | Hemmady et al. | |
| 4,872,159 A | 10/1989 | Hemmady et al. | |
| 4,872,160 A | 10/1989 | Hemmady et al. | |
| 4,958,341 A | 9/1990 | Hemmady et al. | |
| 5,321,722 A * | 6/1994 | Ogawa | 375/222 |
| 5,749,059 A * | 5/1998 | Walton | 701/45 |
| 5,845,272 A * | 12/1998 | Morjaria et al. | 706/50 |
| 6,023,239 A * | 2/2000 | Kovach | 342/357.44 |
| 6,163,678 A | 12/2000 | Murata et al. | |
| 6,311,127 B1 * | 10/2001 | Stratton et al. | 701/213 |
| 6,516,259 B2 * | 2/2003 | Morell et al. | 701/45 |
| 6,757,858 B1 * | 6/2004 | Flammang | 714/746 |
| 6,809,684 B2 * | 10/2004 | Brenner | 342/358 |
| 6,820,213 B1 | 11/2004 | Somers et al. | |
| 6,856,905 B2 * | 2/2005 | Pasturel et al. | 701/214 |
| 6,873,265 B2 * | 3/2005 | Bleier | 340/690 |
| 7,110,483 B1 * | 9/2006 | Hanazaki | 375/354 |
| 7,246,039 B2 * | 7/2007 | Moorhouse | 702/185 |
| 2005/0149830 A1 * | 7/2005 | Mo et al. | 714/776 |

FOREIGN PATENT DOCUMENTS

| | | |
|---|---|---|
| JP | 2001-267994 | 9/2001 |
| JP | 2005-176183 A | 6/2005 |
| KR | 10-0204203 | 3/1999 |
| KR | 1999-0047319 | 7/1999 |
| KR | 100251711 | 1/2000 |
| KR | 2000-0047234 A | 7/2000 |
| KR | 2003-0063847 | 7/2003 |
| KR | 2004-0026736 | 4/2004 |

* cited by examiner

APPARATUS AND METHOD FOR DIAGNOSING FAULT AND MANAGING DATA IN SATELLITE GROUND SYSTEM

TECHNICAL FIELD

The present invention relates to an apparatus and a method for diagnosing fault and processing data in a satellite ground system, which detects and separates the fault to perform telemetry and process telecommand in real-time by dualizing of the satellite ground system. The apparatus and method can prevent unnecessary switching between devices by introducing a penalty method and a data buffer and dualizing the satellite ground system when fault occurs temporarily or data are lost in the middle of transmission. It also prevents wasteful use of devices caused by separation of a faulty device by quantitatively displaying the state of the device by imposing a penalty based on the degree of the fault and reducing the penalty in a temporary fault, and efficiently operate equipment of a satellite ground system device.

BACKGROUND ART

A satellite ground system receives telemetry values from a satellite sent to space, extracts necessary information from the telemetry value, and monitors the state of the satellite. Also, the satellite ground system transmits commands from the ground to the satellite. Therefore, when fault occurs in the satellite ground system, the satellite may not be able to perform an assigned mission because the telemetry received from the satellite can be lost and a wrong command can be transmitted to the satellite. That is, since the satellite ground system should be able to transmit a telecommand for recovery when an unexpected incident happens in the satellite or when the fault occurs, the satellite ground system needs to maintain a robust state. Accordingly, a backup system of the satellite ground system is important.

To maintain robustness of the satellite ground system, conventional satellite ground systems form cold-backup and hot-backup mechanism by dualizing devices for the fault and an abnormal state. The cold-backup method is operating a secondary ground system when a primary ground system has the fault. The hot-backup method simultaneously drives the primary/secondary systems and switches them with each other in real-time.

When a cold-backup device detects fault in a device of the primary system, the cold-backup device stops to use the primary device and uses a secondary device. Since there is a time gap between the cancellation of the operation of the primary ground system and the restart of the operation of the secondary ground system, the cold-backup device has a problem that data can be lost while the devices are switched and the satellite ground system cannot be processed in real-time.

A conventional hot-backup device prevents data loss by dualizing hardware into primary/secondary devices, and when the fault occurs, switching the primary/secondary systems with each other to replace the faulty device. However, since the conventional hot-backup device does not have an appropriate switching mechanism and it does not have a function for determining a simple fault, the switching may occur frequently even when fault occurs temporarily. Also, since primary/secondary devices are simultaneously used, operation equipment becomes large and it is not possible to separate one system out of the other for repair. Although data are not lost as much as they are in the cold-backup, data loss cannot be perfectly prevented in switching.

Although the satellite ground system is dualized, the conventional method can not perfectly prevent data loss. There is also a problem that switching is carried out even when fault occurs temporarily or a data transmission error occurs.

DISCLOSURE OF INVENTION

Technical Problem

It is, therefore, an object of the present invention to provide an apparatus and method for diagnosing fault and processing data in a satellite ground system, which can prevent data loss of a satellite by improving the fault detecting and isolating performance of the satellite ground system, and efficiently operate the satellite ground system when fault occurs temporarily.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided an apparatus for diagnosing fault and processing data of a satellite ground system, comprising: a satellite data processing and controlling block for processing and analyzing data transmitted from a satellite and performing control required for the satellite; a signal transforming block for transforming a signal transmitted from the satellite and transmitting the transformed signal to the satellite ground system; a fault detecting and controlling block for detecting fault by comparing a signal from the satellite data processing and controlling block, all data from the signal transforming block, and a state of each device with each other, and transmitting fault detect contents; a state displaying block for displaying a state of the satellite and the system by displaying a state of the satellite data processing and controlling block, and the fault detecting and controlling block; a penalty managing block which is notified whether the device has fault or not from the fault detecting and controlling block and processing the data based on a penalty value; a data storing block for storing the data when an error is found by the fault detecting and controlling block, and transmitting the data based on a fault state; and a system recovery supporting block for performing a recovery process when fault is declared in the fault detecting and controlling block.

In accordance with one aspect of the present invention, there is provided a method for diagnosing fault and processing data of a satellite ground system, comprising the steps of: a) storing data transmitted from primary and secondary devices of the satellite ground system; b) calculating penalty values in the penalty managing block; c) comparing the penalty values calculated in the step b) with a predetermined fault declaration value T; d) declaring the fault of the device when a penalty value is larger than the fault declaration value T in the step c), transmitting data of a robust device after switching the faulty device and driving the system recovery supporter; and e) checking whether the fault of the device is temporary when the penalty value is not larger than the fault declaration value T in the step c).

Advantageous Effects

The present invention introduces a penalty method and a data buffer to dualize a satellite ground system. The penalty method prevents unnecessary switching between devices when fault occurs temporary and data are lost in the middle of transmission.

The state of the device is displayed quantitatively by giving a penalty based on the degree of the fault and reducing the penalty when the fault is temporary. With this method, the device can be saved from being disposed due to faulty and the equipment of the satellite ground system device can be efficiently operated.

That is, the present invention can maintain the device without taking it out of the satellite ground system when the fault is temporary by dualizing the satellite ground system and supplementing fault detection and isolation method in, and it can display the degree of fault quantitatively. Also, the present invention reduces the cost for replacing an entire device by combining contents of a data buffer and forming new data, and maximizes an effect of the primary device by recovering the faulty device through a support system when the fault occurs. The present invention can process data in real-time and prevent data loss.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on prior art may obscure the points of the present invention, the detailed description will not be provided herein. The preferred embodiments of the present invention will be described in detail hereinafter with reference to the attached drawings.

Figure 1:
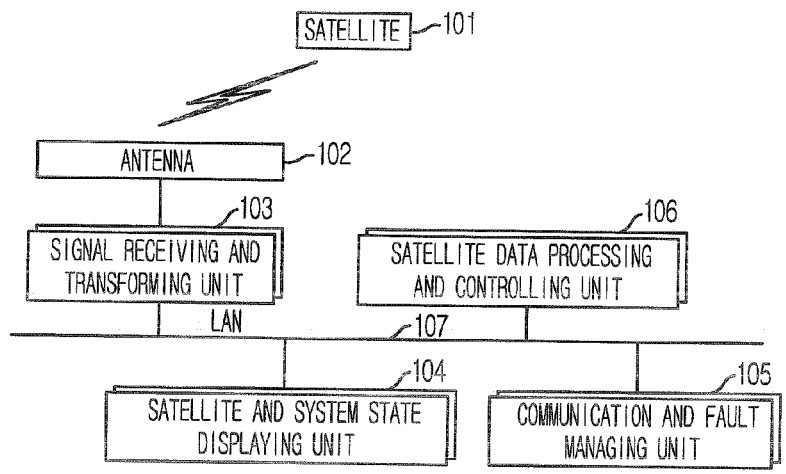
FIG. 1 is a block diagram showing a typical satellite ground system.

FIG. 1 is a block diagram showing a typical satellite ground system. It shows a backup formation.

As shown in FIG. 1, the typical satellite ground system includes a satellite 101, an antenna 102, a signal receiving and transforming unit 103, a satellite data processing and controlling unit 106, a satellite and system state displaying unit 104 and a communication and fault managing unit 105.

The satellite 101 is an object which the satellite ground system controls. The antenna 102 is in charge of wireless communication with the satellite 101.

The signal receiving and transforming unit 103 is a preprocessing system for transmitting a signal transmitted through the antenna 102 to the satellite ground system.

The satellite data processing and controlling unit 106 controls the satellite by processing and analyzing the data transmitted from the satellite 101.

The satellite and system state displaying unit 104 displays the state of the satellite processed in the satellite data processing and controlling unit 106 and the state of the satellite ground system.

The communication and fault managing unit 105 monitors a communication and fault of the system.

Each of the above-mentioned constituent elements is connected to a Local Area Network (LAN) 107 for data transmission/reception.

Figure 2:
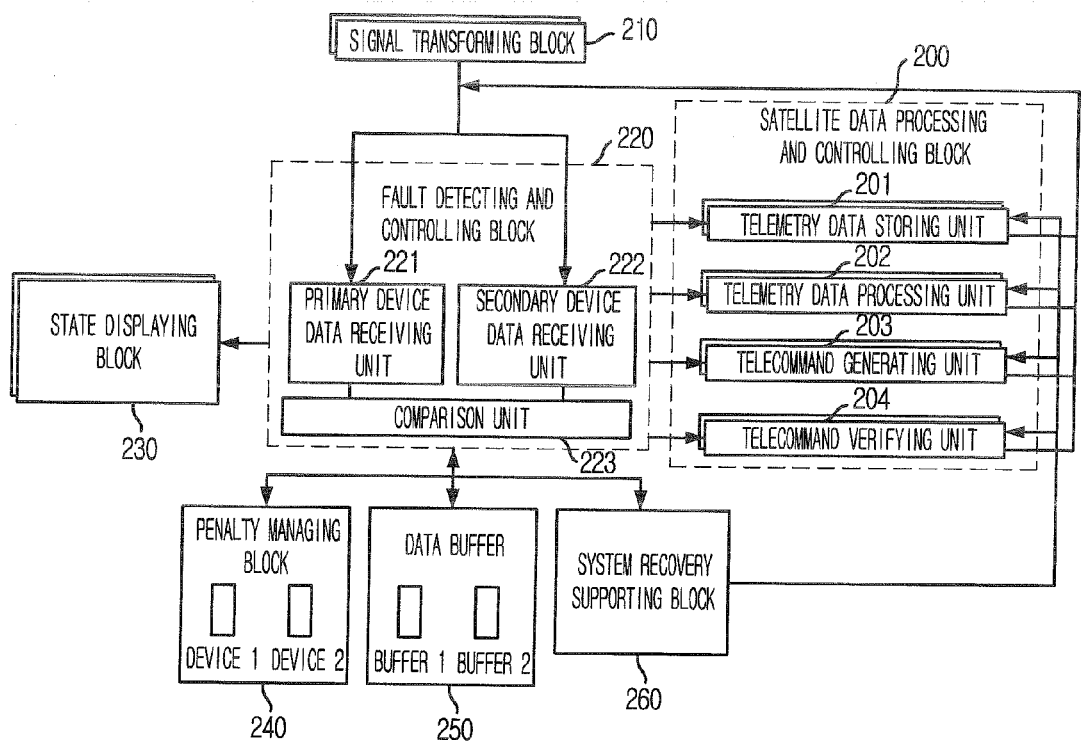
FIG. 2 is a block diagram showing a fault diagnosing and data processing apparatus of a satellite ground system in accordance with an embodiment of the present invention.

FIG. 2 is a block diagram showing a fault diagnosing and data processing apparatus of the satellite ground system in accordance with the embodiment of the present invention. Each device is dualized.

As shown in FIG. 2, the fault diagnosing and data processing apparatus of the present invention includes a satellite data processing and controlling block 200, a signal transforming block 210, a fault detecting and controlling block 220, a state displaying block 230, a penalty managing block 240, data buffer 250 and a system recovery supporting block 260.

The satellite data processing and controlling block 200 controls the satellite by processing and analyzing the data transmitted from the satellite.

The signal transforming block 210 transforms a signal transmitted from the satellite to transmit the signal to the satellite ground system.

The fault detecting and controlling block 220 detects fault by comparing signals from the satellite data processing and controlling block 200, all data from the signal transforming block 210, and the state of each device with each other, and transmits information about the detected fault.

The state displaying block 230 displays the state of the satellite and the system by displaying the state of the satellite data processing and controlling block 200 and the fault detecting and controlling block 220.

The penalty managing block 240 is notified whether the device has fault or not from the fault detecting and controlling block 220, and processes data based on a penalty value.

When fault is detected by the fault detecting and controlling block 220, the data buffer 250 stores and transmits the data based on a degree of the fault.

When the fault detecting and controlling block 220 declares the fault, the system recovery supporting block 260 performs a recovery process.

The satellite data processing and controlling block 200 includes a telemetry data storing unit 201, a telemetry data processing unit 202, a telecommand generating unit 203 and a telecommand verifying unit 204.

The telemetry data storing unit 201 stores telemetry data. The telemetry data processing unit 202 processes the telemetry data stored in the telemetry data storing unit 201.

The telecommand generating unit 203 generates a telecommand for processing satellite data. The telecommand verifying unit 204 verifies a telecommand generated from the telecommand generating unit 203.

The fault detecting and controlling block 220 includes a primary device data receiving unit 221, a secondary device data receiving unit 222 and a comparison unit 223.

The primary device data receiving unit 221 receives data of the primary device and the secondary device data receiving unit 222 receives data of the secondary device.

The comparison unit 223 compares data of the primary device data receiving unit 221 with data of the secondary device data receiving unit 222.

That is, a signal from the satellite data processing and controlling block 200 of the satellite, all data from the signal transforming block 210 and the state of each device are transmitted to each system included in the satellite ground system through the fault detecting and controlling block 220.

In the fault detecting and controlling block 220, the data are separately transmitted to the primary device data receiving unit 221 and the secondary device data receiving unit 222. The data are transmitted individually in the dualized system.

The comparison unit 223 compares the data transmitted through the primary device data receiving unit 221 and the secondary device data receiving unit 222.

It is notified to the penalty managing block 240 whether the device has fault or not. When the device does not have the fault, the data are transmitted to each device requiring the data based on a penalty value.

When there is the fault, the data are individually stored in the data buffer 250 and the data buffer 250 transmits the data based on the degree of the fault.

When the penalty value becomes larger than a fault declaration value, data in a buffer with higher robustness are transmitted. When the fault is temporary, the data in the two buffers are combined and then transmitted. When fault is declared, the device is instantly switched. Also, only the secondary device is used and a recovering command is given to the system recovery supporting block 260.

The system recovery supporting block 260 notifies a faulty device and a fault state to an operator and goes through a recovery process for testing and re-driving the faulty device.

When the system recovery supporting block 260 declares a recovery completion of the faulty device, the device returns to the system and used again, instead of being abandoned permanently.

Figure 3:
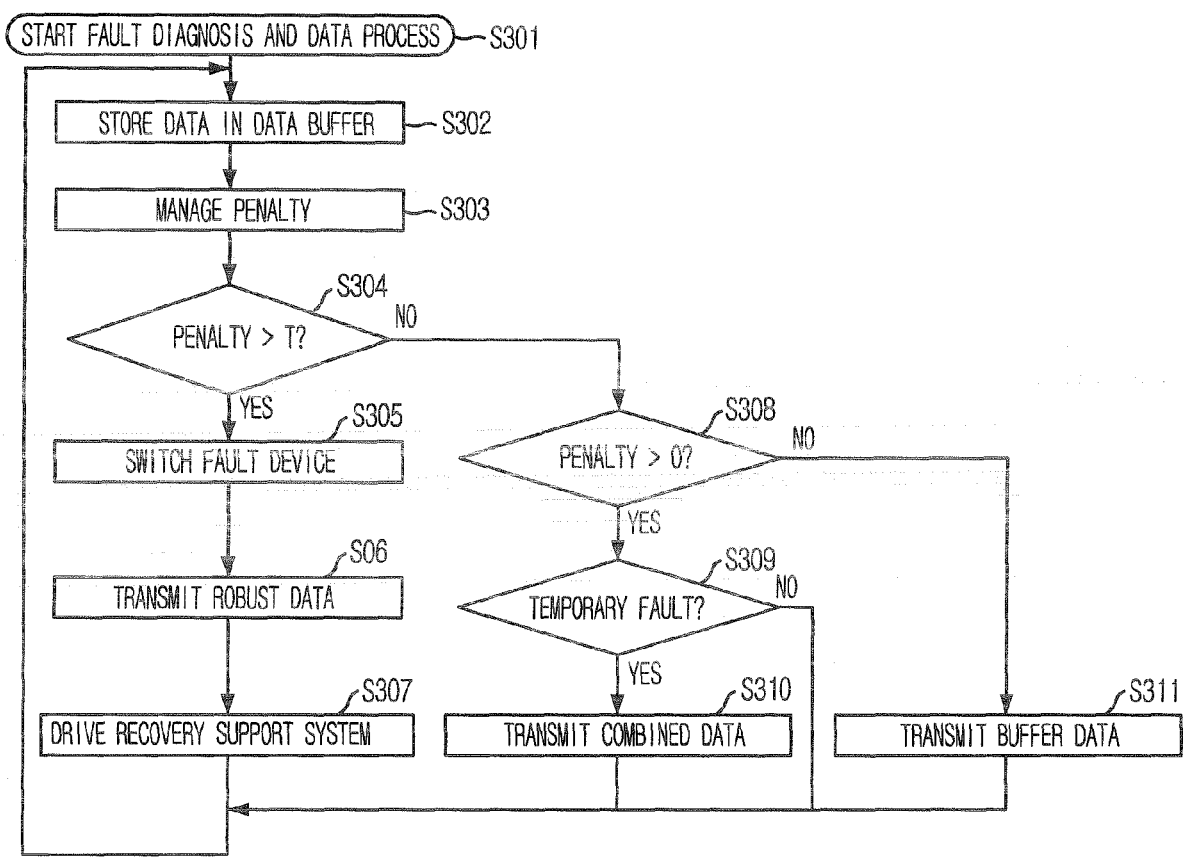
FIG. 3 is a flowchart describing a fault diagnosing and data processing method of the satellite ground system in accordance with an embodiment of the present invention.

FIG. 3 is a flowchart describing a fault diagnosing and data processing method of the satellite ground system in accordance with an embodiment of the present invention.

When the system starts fault diagnosis, the system stores the data transmitted from the primary device and the secondary device in the data buffer 250 and a penalty value is calculated by the penalty managing block 240.

When the calculated penalty is larger than a fault declaration value T in a comparison result of the calculated penalty and the fault declaration value T, it is declared that the device has fault.

When the fault is declared, the faulty device is switched off and the data of the more robust device are transmitted.

The fault of the device is notified by driving the system recovery supporting block 260 and the recovery system is operated by re-driving the system.

When the penalty value is not larger than the fault declaration value, it is checked whether the penalty value is larger than "0". When the fault is temporary, a combined data value is transmitted. When the checking is not finished, the value of the data buffer is maintained and the next data are transmitted.

When the penalty value is "0", the data value in the data buffer 250 is transmitted.

As described above, the fault diagnosing and data processing method of the present invention prevents data loss by frequent switching by switching the device only when the penalty is larger than a predetermined value. Also, the data buffer 250 perfectly prevents data loss by storing the transmitted data in the buffer. When it turns out that the device has fault, the data of the robust device is transmitted. That is, when it turns out that the fault is temporary, the fault declaration by the temporary fault or an error in data transmission by combining and transmitting the data stored in the buffer. When the fault occurs, the system recovery supporting block 260 notifies the device having the fault, which will be called a faulty device hereinafter, to the operator and a fault recovery process is performed.

When the recovery process is finished, the device can be used again in the entire system.

When a fault diagnosing and data processing procedure starts at step S301, the data are stored in the data buffer at step S302 and the penalty is managed at step S303.

When the penalty value is larger than the fault declaration value T in a comparison result of the penalty value and the fault declaration value T at step S304, the faulty device is switched off at step S305, and the robust data are transmitted at step S306. The data are stored in the data buffer at step S302 by driving the system recovery supporting block 260, which is a recovery supporting system, for recover, and receiving the data again.

When the penalty value is smaller than the fault declaration value T in the comparison result of the penalty value and the fault declaration value T at the step S304, it is checked whether the fault is temporary at step S309 by comparing the penalty value with "0" at step S308. When the fault is temporary, the combined data are transmitted at step S310. When the fault is not temporary, the value of the data buffer is maintained.

When the penalty value is "0" the data of the buffer are transmitted at step S311.

Figure 4:
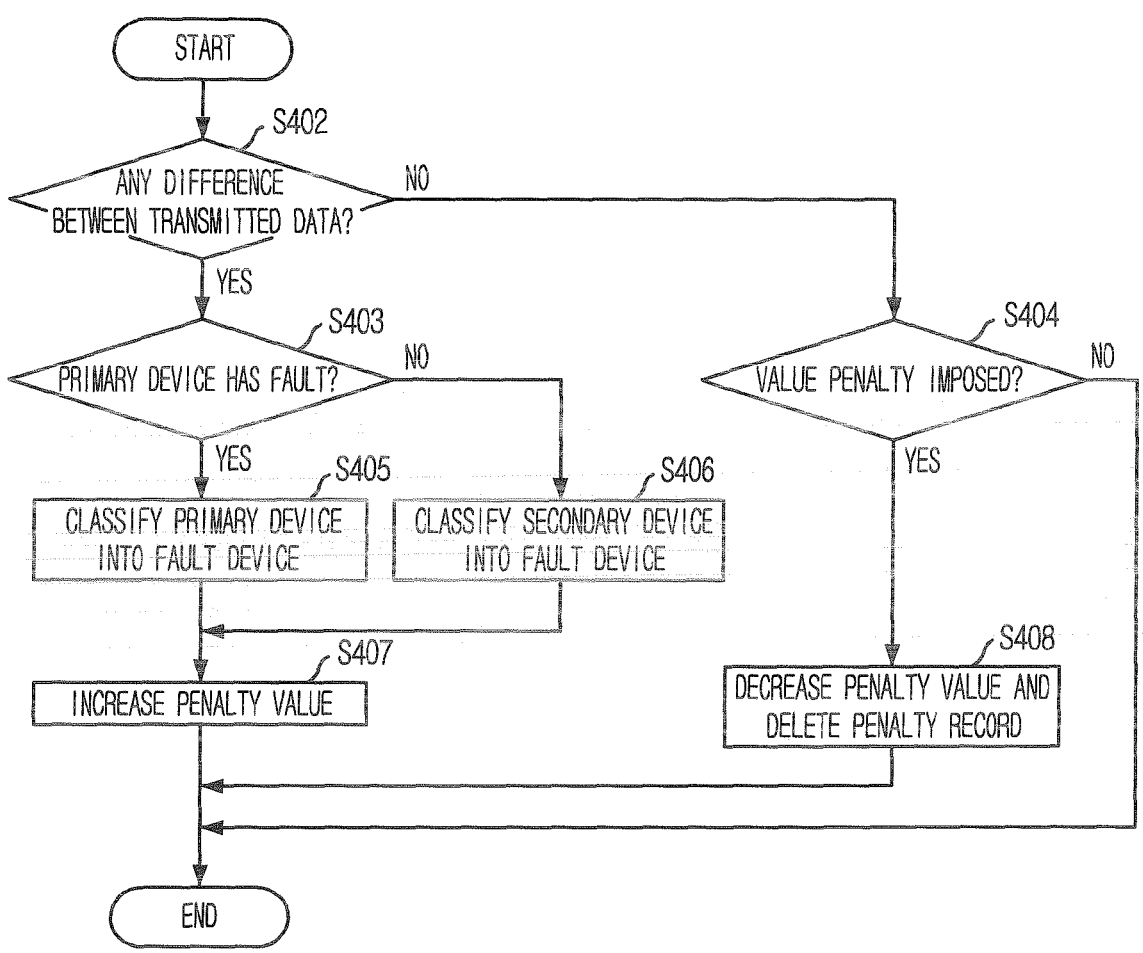
FIG. 4 is a flowchart describing a penalty managing process of the fault diagnosing and data processing method in the satellite ground system in accordance with an embodiment of the present invention.

FIG. 4 is a flowchart describing a penalty managing process of the fault diagnosing and data processing method in the satellite ground system in accordance with an embodiment of the present invention.

As shown in FIG. 4, when the penalty managing process starts, a difference between the data transmitted from the primary device and the secondary device is checked.

When there is a difference, it is checked whether the primary device has fault or not. When the primary device does not have fault, it is determined that the secondary device has fault.

The penalty is increased based on how the fault affects the satellite ground system.

When there is no difference between the data and no error occurs for a predetermined time, the present penalty is reduced or deleted. Although the fault is temporary, a penalty record for the fault state is preserved. When no error is generated for a predetermined time allowed sufficiently, the record is deleted.

When the fault is critical such as halting the operation of hardware, the fault is separated from the system by imposing a fault declaration value. When the fault is a minor error such as data transmission error, only the penalty value is increased by imposing the lowest penalty value instead of separating the faulty device. Therefore, the penalty is imposed based on the degree of the fault. The penalty is differently deleted based on the degree of the fault, i.e., the value of the penalty. When the degree of the fault is the lowest, the penalty record is deleted for the shortest time. If the degree of the fault is the highest, the penalty record is deleted when there is no problem in the system for a long time.

The transmitted data are compared in a penalty managing process of step S402.

When there is a difference between two data, the device is classified into the faulty device at steps S405 and S406 by determining whether the primary device and the secondary device have fault. Also, the corresponding penalty is increased at step S407 by determining the degree of the fault.

When it turns out that there is no difference between the data in a comparison result of the step S402, it is determined at step S404 whether the penalty is imposed before a predetermined time. When there is an imposed penalty, the penalty is decreased or the penalty record is deleted at step S408 based on the fault time. When there is no imposed penalty, the penalty value is transmitted to the next step and the logic flow ends.

When an abnormal state is generated by the fault, the present invention stores transmitted data in the data buffer and increases the penalty of the device. The penalty is differently imposed based on the degree of the fault and the device is separated only when the penalty value is larger than a predetermined value. Therefore, when the fault is temporary, the device can be continuously used without switching. Also, the data loss can be prevented by combining and transmitting the data contents stored in two buffers. When the device is separated from the system by the fault, a system for recovering the faulty device is operated and a recovery process is performed. When the recovery process is completed, the device is returned to the entire system. The method is very efficient for the operation of the device and makes it easy to return the fault system.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains subject matter related to Korean patent application No. 2005-0091530, filed in the Korean Intellectual Property Office on Sep. 29, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An apparatus for diagnosing fault and processing data of a satellite ground system, comprising:
    a satellite data processing and controlling means for processing and analyzing data transmitted from a satellite and performing control required for the satellite;
    a signal transforming means for transforming a signal transmitted from the satellite and transmitting the transformed signal to the satellite ground system;
    a fault detecting and controlling means for detecting fault by comparing a signal from the satellite data processing and controlling means, all data from the signal transforming means, and a state of each device with each other, and transmitting fault detect contents;
    a state displaying means for displaying a state of the satellite and the system by displaying a state of the satellite data processing and controlling means, and the fault detecting and controlling means;
    a penalty managing means which is notified whether the device has fault or not from the fault detecting and controlling means and processing the data based on a penalty value;
    a data storing means for storing the data when an error is found by the fault detecting and controlling means, and transmitting the data based on a fault state; and
    a system recovery supporting means for performing a recovery process when fault is declared in the fault detecting and controlling means.

2. The apparatus as recited in claim 1, wherein the satellite data processing and controlling means includes:
    a telemetry data storing unit for storing data on which telemetry is performed by the satellite;
    a telemetry data processing unit for processing telemetry data stored in the telemetry data storing unit;
    a telecommand generating unit for generating a telecommand to process the satellite data; and
    a telecommand verifying unit for verifying the telecommand generated in the telecommand generating unit.

3. The apparatus as recited in claim 1, wherein the fault detecting and controlling unit, includes:
    a primary device data receiving unit for receiving primary device data of the satellite ground system;
    a secondary device data receiving unit for receiving secondary device data of the satellite ground system; and
    a comparison unit for comparing the data of the primary device data receiving unit with the data of the secondary device data receiving unit.

4. The apparatus as recited in claim 1, wherein the fault detecting and controlling means receives data individually in the primary device data receiving unit and the secondary device data receiving unit, and transmits the data individually in the dualized satellite ground system.

5. The apparatus as recited in claim 4, wherein when the data transmitted from the primary and secondary device data receiving unit are compared by the comparison unit, the fault detecting and controlling unit notifies to penalty managing unit whether the devices have an error, transmits each data to a device requiring the data when the devices have no error based on a penalty value, stores the data in the storing unit when the devices have an error and transmits the data based on a fault state.

6. The apparatus as recited in claim 4, wherein the penalty managing means transmits data of a robust buffer when a penalty value becomes larger than a fault declaration value, transmits combined buffer data when fault is temporary, immediately switches off the device when the fault is declared, has only the secondary device be used and gives a recovery command to the system recovery supporting means.

7. The apparatus as recited in claim 4, wherein the system recovery supporting means notifies a faulty device and a fault state to an operator, goes through a recovery process including testing and re-driving of the faulty device, and prevents the faulty device from being abandoned permanently by returning the device to the system when it is declared that recovery process is completed.

8. A method for diagnosing fault and processing data of a satellite ground system, comprising the steps of:
    a) storing data transmitted from primary and secondary devices of the satellite ground system;
    b) calculating penalty values in the penalty managing means;
    c) comparing the penalty values calculated in the step b) with a predetermined fault declaration value T;
    d) declaring the fault of the device when a penalty value is larger than the fault declaration value T in the step c), transmitting data of a robust device after switching the faulty device and driving the system recovery supporter; and
    e) checking whether the fault of the device is temporary when the penalty value is not larger than the fault declaration value T in the step c).

9. The method as recited in claim 8, wherein in the step a), data loss is prevented by storing the transmitted data in a data buffer, and the fault declaration by the temporary fault or an error in data transmission is also prevented by transmitting the data of the robust device when the device has the fault, and combining and transmitting the data stored in the buffer when the fault is temporary.

10. The method as recited in claim 8, wherein the step b), includes the steps of:
- b1) determining whether the device has fault by checking data transmitted from the primary and secondary devices if there is a difference;
- b2) increasing a penalty value based on a result of the step b1) and an effect of the fault on the satellite ground system; and
- b3) decreasing a present penalty value when there is no difference between data in the step b1) and no fault occurs for a predetermined time.

11. The method as recited in claim 8, wherein in the step b), a penalty record for the fault state is preserved although the fault is temporary, and the penalty record is deleted when no error occurs for a predetermined time.

12. The method as recited in claim 11, wherein a penalty value is imposed based on a degree of the fault in the step b) and when no fault occurs in the satellite ground system, a record on penalty is deleted and time taken for deleting the penalty record is based on the penalty value.

13. The method as recited in claim 11, wherein in the step e), the penalty value is compared with "0" to figure out whether the fault is temporary.

14. The method as recited in claim 11, wherein in the step e), the combined data are transmitted when the fault is temporary.

15. The method as recited in claim 11, wherein in the step e), a value of the data buffer is maintained when the fault is not temporary.

16. The method as recited in claim 11, wherein in the step e), the data of the buffer are transmitted when the penalty value is "0".

17. The method as recited in claim 8, wherein in the step b), the fault is separated from the satellite ground system by imposing a fault declaration value when the fault halts or hinders operation of hardware.

18. The method as recited in claim 8, wherein in the step b), the penalty value is increased instead of separating faulty device by imposing the lowest penalty value when the fault is only a minor error.

* * * * *